Patented Mar. 10, 1931

1,795,455

UNITED STATES PATENT OFFICE

ALBERT E. VAUGHN, OF LOS ANGELES, CALIFORNIA

MASKING PASTE

No Drawing.   Application filed September 11, 1928.   Serial No. 305,320.

This invention relates to masking pastes, and the principal object is to provide an improved masking paste adapted particularly for use in the painting of signs, furniture, automobiles, etc., whereby a plurality of colors may be applied and certain portions of the sign or article to be painted may be covered with the masking paste so as to prevent the application of a succeeding color thereto.

My improved masking paste is especially adapted to the painting of signs, and an object is to provide a paste which is non-drying and which is of a proper consistency and possesses such qualities that it will readily "pull" or follow the brush when the paste is used for forming letters or characters on a sign.

It is also of such a character that sharp margins may be formed to the letters or characters and the paste will not run and provide ragged or irregular margins.

In the consideration of this invention, it will be understood that many different kinds of masking pastes are available in the market, and are used with more or less success. Such pastes, however, usually include oils or greases, which do not possess the characteristics hereinabove mentioned for an ideal masking paste.

I have found by experimentation and use that certain ingredients which I believe to have been heretofore unknown and not used in masking paste are particularly adapted for carrying out the objects of my invention.

For instance, I have discovered that butter fat, particularly as found in ordinary commercial condensed milk, sweetened or unsweetened when mixed with honey and glycerine, will impart characteristics to masking paste which enable me to attain the objects of my invention and to provide a masking paste of excellent quality, durability and general usefulness for the purposes stated. The condensed milk used is actually an evaporated milk of the consistency of a thick emulsion or a thin paste, capable of being spread on a surface by a brush and which will not run when so spread.

In carrying out my invention I prepare an initial emulsion which is composed of substantially the following named ingredients, mixed in the following proportions, to-wit:

| | Parts |
|---|---|
| Honey | 10 |
| Evaporated milk (emulsion) | 8 |
| Glycerine | 6 |

To the above emulsion it is preferable to add a slight quantity of sulphurated potassium, which neutralizes the odor of the emulsion and at the same time prevents the thickening of the emulsion.

The ingredients in the proportions named are thoroly mixed by stirring or otherwise, and thereafter a substantial quantity of suitable pigment in finely pulverized form is added to the emulsion for lending color and body thereto. I prefer to use as a pigment yellow ochre, which is a clay product and is particularly adapted to mixture with the ingredients of the emulsion, and at the same time is available in large quantities and is relatively economical in cost as compared with other pigments.

Assuming the average weight of the ingredients of the emulsion to be as follows, honey 12 lbs. to the gal., condensed milk 11 lbs. to the gal., and glycerine 10 lbs. to the gal., the total weight of a sample emulsion would approximate 268 lbs. I then add to the above named bulk approximately 200 lbs. of yellow ochre or other pigment and thoroly mix the pigment with the emulsion. Thereafter the completed masking paste is ground in a suitable paint mill as in the case of other paints, and is in readiness for application with a brush.

I have ascertained in the course of my experiments that condensed milk or butter fat mixed with water or other liquid in substantially the proportion of the butter fat and water contained in condensed milk will impart a quality to the masking paste whereby the paste will spread smoothly and evenly over a surface and will enable an artist to apply the paste with a consistency thin enough for painting signs.

The ingredients of the emulsion hereinabove named have a natural affinity for each other and will uniformly mix with each other so as to provide a somewhat viscous liquid or emulsion before the pigment is added. The honey ingredient of itself will not "pull" or follow the brush and remain where applied or conform to the sharp outlines of letters or characters of a sign without reduction by mixture therewith of some other ingredient. This necessary ingredient I have found is best supplied in ordinary condensed milk of commercial consistency, which not only mixes thoroly with the honey and glycerine, but reduces the honey to a consistency which causes the honey to "pull" or follow the brush, prevents the creeping of the paste beyond the margins of the letters, and effects a more even spreading of the paste over the surfaces to which it is applied.

Glycerine has a tendency to absorb moisture from the atmosphere, so that without some ingredient which will decrease this tendency the consistency of the masking paste would be varied according to the humidity of the atmosphere. A too moist paste would run beyond the margins of the surfaces covered thereby and render the margins ragged and irregular. The mixture of the honey and condensed milk with the glycerine, however, prevents the running of the paste due to the fact that the milk and honey, if not actually repellent to moisture, do not attract moisture to the same extent as the glycerine.

The purpose of a masking paste such as I have described is mentioned in a Patent No. 1,646,565, for method of making signs, granted to me on the 10th day of May, 1927. Briefly stated, however, in sign work a surface may be sprayed with a pigment of given color for providing a background; thereafter the letters or characters are painted on the background with my improved masking paste; and finally the entire surface may be sprayed with a pigment or lacquer of a different color, after which the masking paste which is non-drying and non-adhesive may be washed or otherwise removed from the surface after the final coat has dried.

Thus the letters or characters formed by the masking paste will be of the color of the background, while the surrounding surface will be of the color of the second coat applied.

When used in connection with the painting of furniture, automobiles, and other articles, parts or portions of the articles which are nickle plated or which are of a different color, or which it may not be desired to color, may be covered with my masking paste, after which the coloring may be sprayed onto the article, and when dry, the masking paste removed. Thus the parts or portions covered by the masking paste will not partake of the color applied to other parts or portions.

What I claim is:

1. A masking paste formed by mixing honey, evaporated milk and glycerine to form an emulsion, and a pigment mixed with the emulsion to provide a body, for the purpose described.

2. A masking paste comprising an initial mixture of honey, evaporated milk and glycerine to provide a vehicle, sulphurated potassium for neutralizing and preventing the thickening of the emulsion, and a pigment for providing a body and a consistency to the paste which is adapted to application to a surface by means of a brush.

3. A masking paste comprising honey 10 parts, evaporated milk 8 parts, glycerine 6 parts, and substantially 18 part of yellow ochre, as described.

4. A masking paste comprising honey 10 gals., evaporated milk 8 gals., glycerine 6 gals., and yellow ochre 200 lbs., as described.

5. A masking paste comprising honey 10 gals., evaporated milk 8 gals., glycerine 6 gals., sulphurated potassium in a sufficient quantity, and 200 lbs. of pigment, as described.

ALBERT E. VAUGHN.